United States Patent
Bell et al.

(10) Patent No.: US 7,118,133 B2
(45) Date of Patent: Oct. 10, 2006

(54) SEAT BELT PRETENSIONER

(75) Inventors: John Bell, Carlisle (GB); Brian A. Jack, Annan (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 11/185,370

(22) Filed: Jul. 20, 2005

(65) Prior Publication Data

US 2006/0038391 A1 Feb. 23, 2006

Related U.S. Application Data

(63) Continuation-in-part of application No. 11/157,642, filed on Jun. 21, 2005, which is a continuation-in-part of application No. 11/145,766, filed on Jun. 6, 2005, which is a continuation-in-part of application No. 10/874,911, filed on Jun. 24, 2004.

(30) Foreign Application Priority Data

Jul. 26, 2004 (EP) .................................. 04254459
Mar. 22, 2005 (EP) .................................. 05251728

(51) Int. Cl.
*B60R 22/36* (2006.01)
(52) U.S. Cl. .................................................. 280/806
(58) Field of Classification Search ............. 280/801.1, 280/801.2, 806; 297/216.15, 216.16, 216.17, 297/216.18, 216.19, 470, 471, 472
See application file for complete search history.

(56) References Cited

U.S. PATENT DOCUMENTS 5,374,110 A 12/1994 Hiramatsu
5,397,075 A 3/1995 Behr
5,564,748 A 10/1996 Kmiec et al.
5,639,120 A 6/1997 Kmiec et al.
5,887,897 A 3/1999 Gill et al.
5,911,440 A 6/1999 Ruddick et al.
5,944,350 A 8/1999 Grabowski et al.
5,967,440 A 10/1999 Marshall
5,971,488 A 10/1999 Pedronno et al.
6,036,274 A 3/2000 Kohlndorfer et al.
6,039,353 A 3/2000 Bauer et al.
6,113,145 A 9/2000 Evans
6,142,524 A 11/2000 Brown et al.
6,193,296 B1 2/2001 Motozawa et al.
6,213,511 B1 4/2001 Downie et al.
6,213,513 B1 4/2001 Grabowski et al.
6,238,003 B1 5/2001 Miller, III et al.

(Continued)

FOREIGN PATENT DOCUMENTS

DE 2 234 246 1/1974

(Continued)

*Primary Examiner*—Faye M. Fleming
(74) *Attorney, Agent, or Firm*—Lonnie Drayer

(57) ABSTRACT

A seat belt pretensioner acts upon the sill end of a three point seat belt. A fixed member of the pretensioner is adapted to be fixed to a load bearing part of the vehicle. A movable member is connected to the sill end of the seat belt and is slideable with respect to the fixed member. The movable member is moved in a direction that is longitudinal relative to the fixed member to move the sill end of the seat belt in a pretensioning direction in response to a signal from a crash sensor. In this way the sill end of the seat belt is free to move along a connecting member when the seat belt is not under tension either from use in restraining a seat occupant and/or from a pretensioning operation.

28 Claims, 12 Drawing Sheets

U.S. PATENT DOCUMENTS

| | | |
|---|---|---|
| 6,419,271 B1 | 7/2002 | Yamada et al. |
| 6,626,463 B1 | 9/2003 | Arima et al. |
| 2002/0043796 A1 | 4/2002 | Weber et al. |
| 2002/0105181 A1 | 8/2002 | Specht et al. |
| 2003/0010560 A1* | 1/2003 | Motozawa ............ 180/268 |
| 2003/0029661 A1 | 2/2003 | Motozawa |
| 2003/0090101 A1 | 5/2003 | Ennerdal |
| 2003/0122362 A1 | 7/2003 | Ukita et al. |
| 2003/0137140 A1 | 7/2003 | Lutz et al. |
| 2003/0230661 A1 | 12/2003 | Bell et al. |
| 2004/0046382 A1 | 3/2004 | Ball et al. |
| 2004/0212188 A1 | 10/2004 | Terasaki |

FOREIGN PATENT DOCUMENTS

| | | |
|---|---|---|
| DE | 3341678 A1 * | 5/1985 |
| FR | 2 180 151 | 11/1973 |
| FR | 2 855 126 | 11/2004 |
| JP | 01-285438 | 11/1989 |
| JP | 02-147454 | 6/1990 |
| JP | 3153411 | 7/1991 |
| JP | 50-35815 | 2/1993 |
| JP | 5085306 | 4/1993 |
| JP | 5105029 | 4/1993 |
| JP | 7196011 | 8/1995 |
| JP | 2001163179 | 6/2001 |
| JP | 2001213277 | 8/2001 |
| JP | 2001247010 | 9/2001 |
| JP | 2001301565 | 10/2001 |
| JP | 2002145013 | 5/2002 |
| JP | 2002211352 | 7/2002 |
| JP | 2002211353 | 7/2002 |
| JP | 2002211354 | 7/2002 |
| JP | 2002308045 | 10/2002 |
| JP | 2002337660 | 11/2002 |
| JP | 2002362311 | 12/2002 |
| JP | 2003025939 | 1/2003 |
| JP | 2003054360 | 2/2003 |
| JP | 2003081053 | 3/2003 |
| JP | 2003127829 | 5/2003 |
| WO | WO 95/31359 A | 11/1995 |

* cited by examiner

SEAT BELT PRETENSIONER

This is a Continuation-in-Part of application Ser. No. 11/157,642 filed Jun. 21, 2005; which is a Continuation-in-Part of application Ser. No. 11/145,766 filed Jun. 6, 2005; which is a Continuation-in-Part of application Ser. No. 10/874,911 filed Jun. 24, 2004.

FIELD OF THE INVENTION

The present invention relates to a pretensioner for a vehicle seat belt.

BACKGROUND OF THE INVENTION

Traditionally a seat belt comprises a length of seat belt webbing connected at three points to load bearing parts of a vehicle. Typically one end is bolted to a door sill on one side of the seat, and is arranged to pass laterally across the hips of the vehicle occupant to a buckle mechanism fixed to the vehicle on the opposite side of the seat, and then diagonally across the torso of the vehicle occupant to a further fastening point on the B pillar of the door. The buckle mechanism engages a buckle tongue slideably attached to the webbing.

To increase the comfort of the vehicle occupant restrained by the seat belt a retractor is attached to the pillar end of the webbing. This allows the webbing to pay out under relatively low loads to enable limited movement of the vehicle occupant, for example to reach in-car entertainment controls or storage compartments. The retractor is biased to keep the webbing relatively taut about the vehicle occupant and a locking element is included to lock the retractor against webbing pay out in the event of a crash being detected. For example, an acceleration sensor activates if the vehicle undergoes rapid acceleration or deceleration indicative of a crash.

In recent years, pretensioners have been introduced to rapidly pull in a length of seat belt webbing to tighten the seat belt about the vehicle occupant in of a crash. This takes up any slack that may have developed in the seat belt and helps to more correctly position the vehicle occupant in the seat to maximize the effect of the seat belt protection and of any secondary safety restraint such as an airbag.

Pretensioners comprise a force reservoir such as a pyrotechnically operated gas generator to provide an impulse of sufficient magnitude to tighten the seat belt in a short space of time, ideally before the crash takes full effect. A typical known pretensioner may use rotational means to wind in a length of seat belt webbing, for example by rotating the retractor spool in a webbing rewind direction to take in the required length of webbing prior to the retractor locking against webbing pay out.

However, known pretensioners tend to be bulky, and are particularly difficult to use for the driver and front passenger seats of a two door vehicle because of the requirement to allow access to the rear of the vehicle past the front seats. Using a traditional retractor pretensioner mechanism in a front seat of a two door vehicle causes an unacceptable obstruction.

Seat travel is greater in a two door vehicle than in a four door vehicle to provide access to the rear seat and to accommodate this the door sill end of the webbing is usually attached to a so-called slider bar of well known design, instead of being bolted to the floor. This allows the sill end of the webbing to be moved forward and rearward to facilitate rear seat access and front seat movement. The present invention provides an improved pretensioning mechanism that can be used in two-door, front seat applications.

It has been difficult to design suitable pretensioners for use with slider bars and/or for use in three-door vehicles without obstructing the function of the slider bar or obstructing access to the rear seats.

The present invention provides an improved pretensioning device.

SUMMARY OF THE INVENTION

According to the present invention there is provided a seat belt pretensioner that acts upon the sill end of a three point seat belt, comprising: a fixed member adapted to be fixed to a load bearing part of the vehicle, a movable member connected to the sill end of the seat belt, means for moving the movable member in directions that are longitudinal relative to the fixed member, to move the sill end of the seat belt in a pretensioning direction in response to a signal from a crash sensor, and an elongate connecting member to which the sill end of the seat belt is slidably attached. In this way the sill end of the seat belt is free to move along the connecting member when the seat belt is not under tension either from use in restraining a seat occupant and/or from a pretensioning operation.

DETAILED DESCRIPTION OF THE INVENTION

As used herein and in the claims terms such as "forward" and "rearward", "front" and "back" and similar terms are understood to be correlated to the front and rear of a vehicle in which the seat belt pretensioning apparatus of the invention is installed. Furthermore, as used herein and in the claims terms such as "above" and "below", and "higher" and "lower" are understood to be correlated to the roof and floor of the passenger compartment of a vehicle in which the seat belt pretensioning apparatus of the invention is installed.

Figure 1:
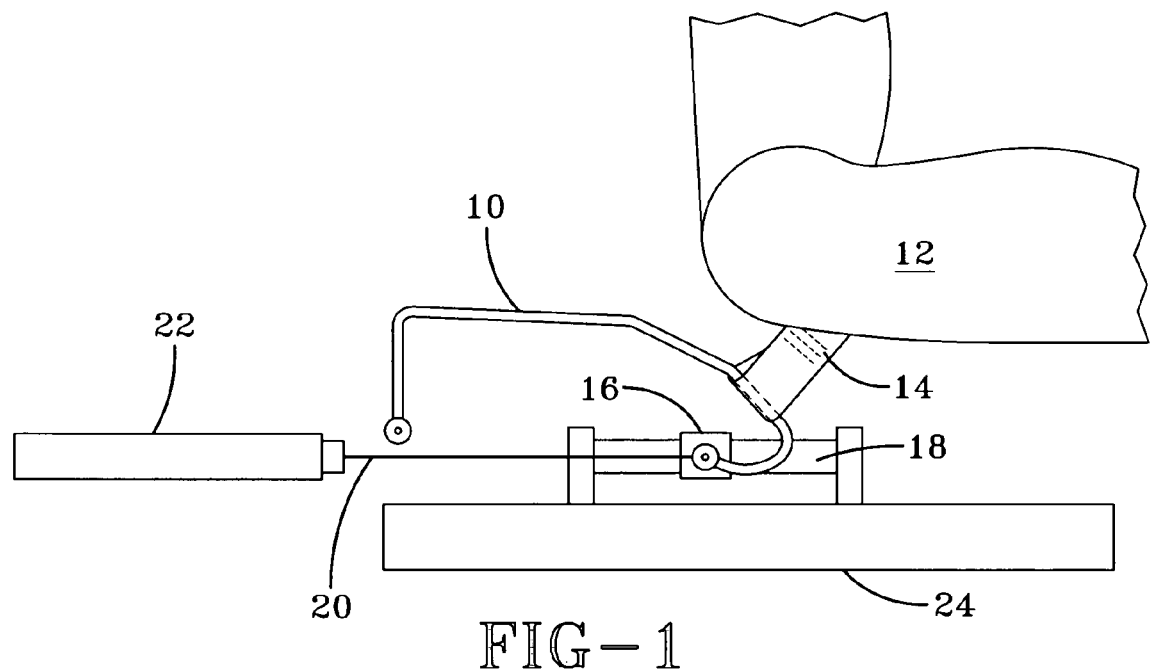
FIG. 1 is a schematic side elevation view of a pretensioner according to a first embodiment of the present invention.

In the first embodiment of FIG. 1, a slider bar 10 is positioned adjacent to a front seat 12 of a vehicle. One end of seat belt webbing 14 passes around the slider bar 10 and is free to move back and forth along the slider bar 10.

The seat belt webbing 14 is of a conventional design and is attached at one end to a retractor mounted, adjacent a seat, to a structural member of the vehicle such as a vehicle side pillar (not shown). The webbing passes through a shoulder support also attached to the side pillar and has a buckle tongue, which is insertable into a buckle (not shown) located on the other side of the seat.

When in use, the seat belt webbing 14 is at one end of the slider bar 10 in the load bearing position shown in FIG. 1. When the seat belt is not in use the end of the webbing 14 may be moved in a rearward direction along the slider bar 10 so that it does not obstruct access to the rear seat of the vehicle.

One end of the slider bar 10 is attached to a carriage 16 that is mounted on a rail 18. The use of a rail is particularly beneficial since the pretensioning action can be constrained to a linear motion in one direction in a simple manner and without the need for complicated or bulky rotating parts. A cable 20 extends between the carriage 16 and a pyrotechnic unit 22. The pyrotechnic unit 22 is of a known type and contains a piston within a cylindrical housing and a gas generator. The gas generator is pyrotechnically activated to provide an impulse that forces the piston in a rearward direction and tensions the cable 20. The pyrotechnically operated gas driven piston-cylinder arrangement functions as a force reservoir. Such a pyrotechnic unit is particularly suited to this application since it provides an impulse of the required magnitude over a short time period. Positioning the piston and cylinder below the rail advantageously reduces the overall size of the pretensioner. The piston-cylinder arrangement may incorporate means to allow the second member to only move in a pretensioning direction, for example by ratchet teeth on the inside of the cylinder and at least one cooperating tooth on the piston.

Figure 2:
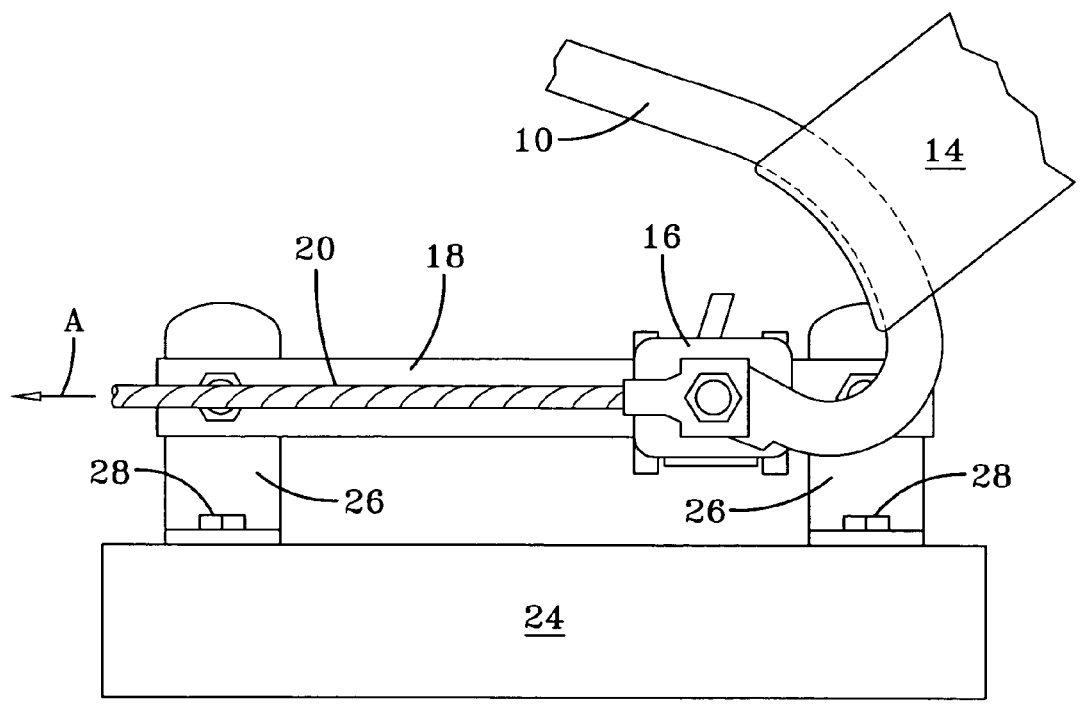
FIG. 2 is an enlarged side elevation view of part of the pretensioner of FIG. 1 before pretensioning.

FIG. 2 shows one arrangement of the carriage 16 and the rail 18 in greater detail. The rail 18 is attached at each end to support members 26 that are attached to a load bearing chassis member 24 by means of bolts 28. Such a load bearing chassis member 24 may be a structural member extending in a longitudinal direction down each side of the vehicle, or a load bearing door sill and provides a suitable load bearing anchorage zone for the slider bar 10 adjacent to and slightly to the rear of each of the vehicle doors, in a known three-door vehicle.

Prior to pretensioning, the carriage 16 is positioned for normal use of the seat belt webbing 14 at its forward most position, at the right hand side as shown in FIG. 2 of the rail 18. Upon sensing an acceleration of the vehicle above a predetermined criteria, a crash sensor generates a signal indicative of a crash condition which causes the pyrotechnic unit 22 to fire, creating a tension in the metal cable 20. Advantageously the crash sensor is activated when the vehicle exceeds a predetermined acceleration or deceleration threshold. The tension in the cable 20 pulls the carriage 16 and the slider bar 10 in a rearward direction i.e. the direction indicated by an arrow A in FIG. 2. The carriage 16 can be arranged to move rearwardly a distance in the region of 50 to 150 mm depending on the vehicle size and requirements.

The sudden movement of the slider bar 10 in a rearward direction provides tension in the seat belt webbing 14, which takes up any slack in the webbing 14 and pulls a vehicle occupant backwards into the seat 12 to correctly position the vehicle occupant within the seat 12 to maximize the benefit of the seat belt and correctly position the vehicle occupant for maximum effect of any secondary restraint such as an air bag.

Figure 3:
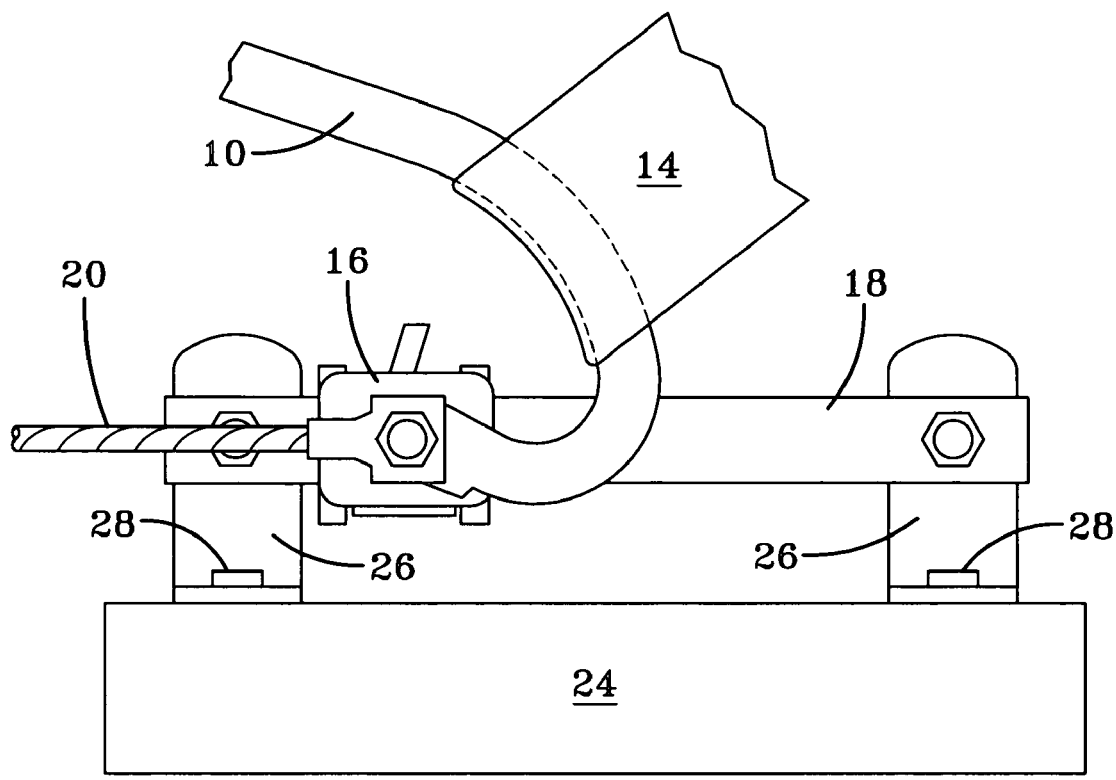
FIG. 3 is an enlarged side elevation view of part of the pretensioner of FIG. 1 after pretensioning.

FIG. 3 shows the position of the carriage immediately after pretensioning. After the pyrotechnic unit has fired, the carriage 16 is prevented from returning to its original position under the forward momentum of the vehicle occupant during a crash, by a ratchet mechanism within the carriage forming the second member 16. This ratchet mechanism is shown more clearly in FIG. 5.

Figure 5:
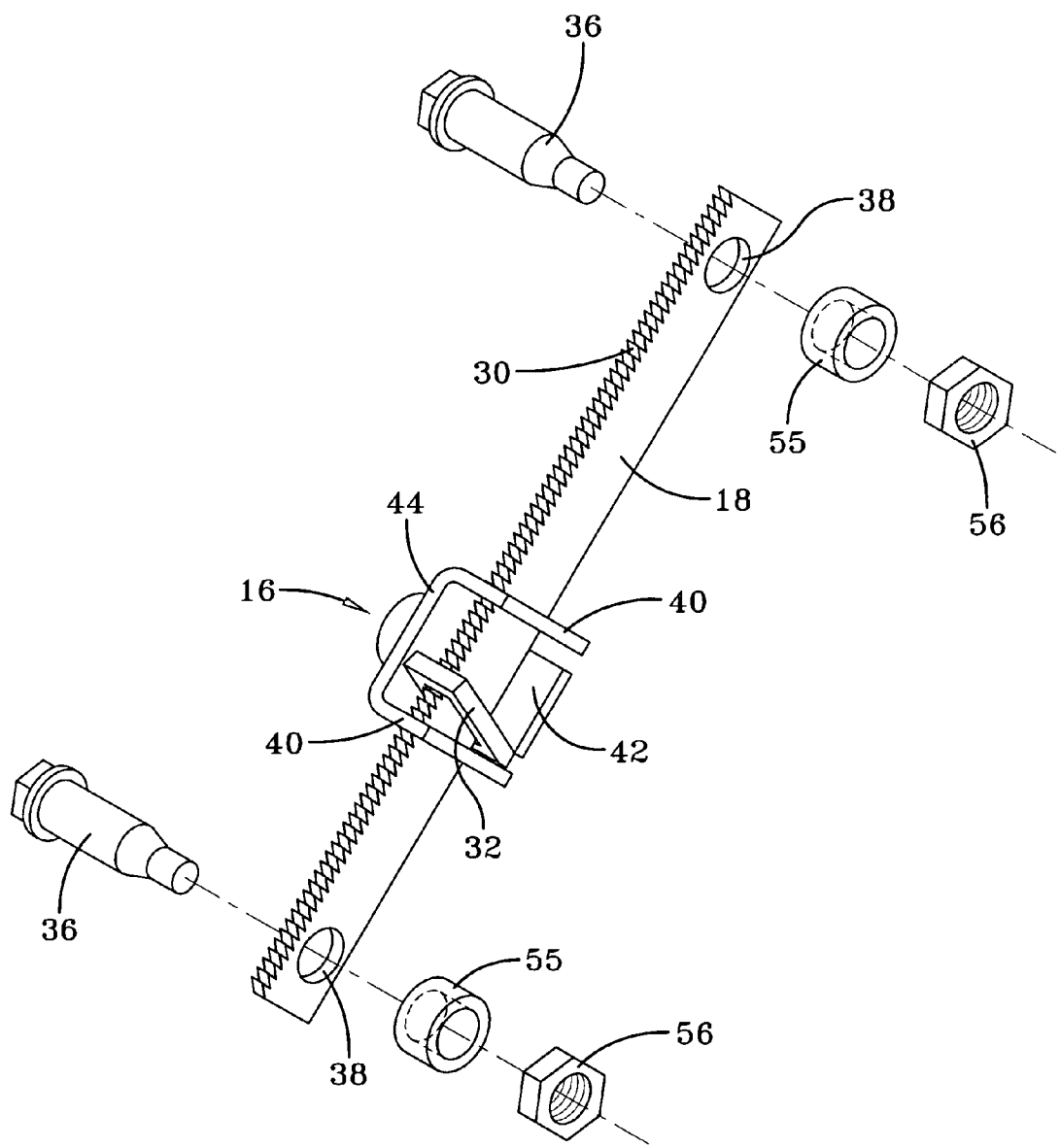
FIG. 5 is an exploded perspective view of the carriage and rail components the pretensioner of FIG. 1.

FIG. 5 is an exploded view showing the ratchet mechanism. The rail 18 is attached at each of its ends to respective support members 26 by bolts 36 passing through cylindrical holes 38 at each end of the rail 18. The bolts 36 are secured with appropriate washers or spacers 55 and nuts 56. Locking ratchet teeth 30 are formed in one surface of the rail 18. The carriage 16 has two end plates 40 and a base plate 42 attached to a side wall 44. A locking lever 32 extends from the base plate 42. Each of the end plates 40 and the locking lever 32 have a slot, allowing the rail 18 to pass through the center of the carriage 16.

An inner surface of the locking lever 32 is in contact with the teeth 30 in the surface of the rail 18 and is orientated at an angle such that the locking lever 32 can pass over the teeth 30 in one direction. However the locking lever 32 is biased such that if it tries to move in the opposite direction, a locking edge of the inner surface of the locking lever 32 will be caught against a tooth 30 on the upper surface of the rail 18 and thus prevents the carriage 16 from sliding in a reverse direction. To facilitate this the teeth 30 may be of a saw-tooth form. Locking the pretensioner against return movement in this way prevents a loss of tension in the seat belt after pretensioning has been carried out.

The slider bar 10, the carriage 16 and ratchet mechanism, the rail 18, the support members 26 and the bolts 28, 36 and 46 are all preferably made of metal. Ratchet mechanisms are known for different seat belt restraint applications and so the pretensioner of the present invention can advantageously be constructed using standard parts and manufacturing processes, and thus offers a relatively low cost locking mechanism. The ratchet mechanism and the carriage 16 may be formed from parts of a height adjuster traditionally used to alter the height of the belt shoulder support.

Figure 4:
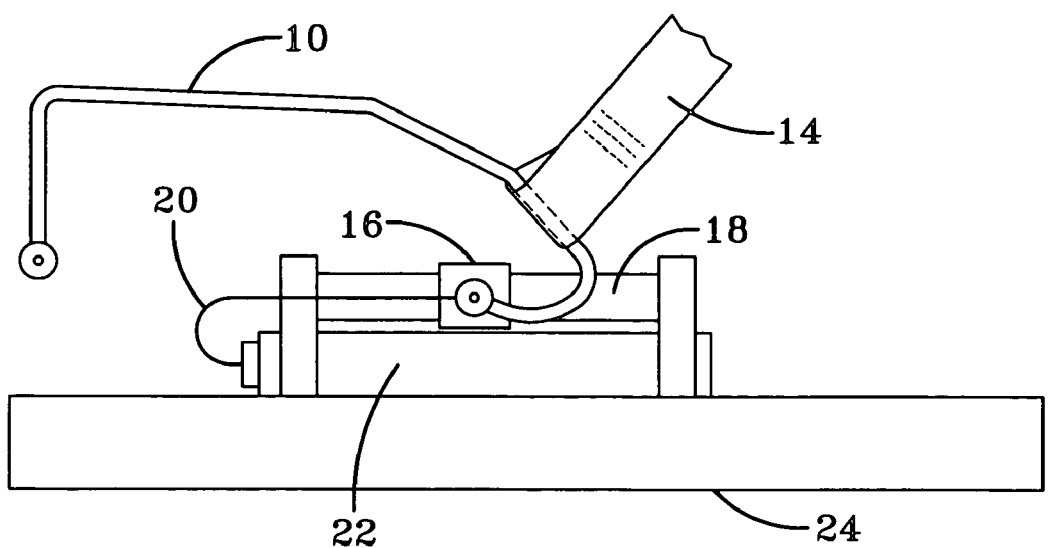
FIG. 4 is a side elevation view of an alternative arrangement of the pretensioner of FIG. 1.

In FIG. 4 the pyrotechnic unit is shown stored beneath the rail 18 and the bolts 36 and corresponding holes 38 in the rail may be used to fix the pyrotechnic unit 22 in relation to the rail 18. The operation of the pretensioner in FIG. 4 is substantially the same as that shown in FIG. 1, except that the cable 20 bends 180° to compensate for the different orientation of the pyrotechnic unit 22.

According to the further embodiments that are described below the slider bar function is carried out by having the seat belt webbing connected to an elongate flexible member such as, for example, a cable, around which the seat belt webbing passes. One end of the cable is moveable and the other end is fixed. The flexible member thus preferably form a loop, in the general form of a slider bar, to provide the flexibility of movement for the webbing and access to the rear of a vehicle, required in two-door applications.

Figure 6:
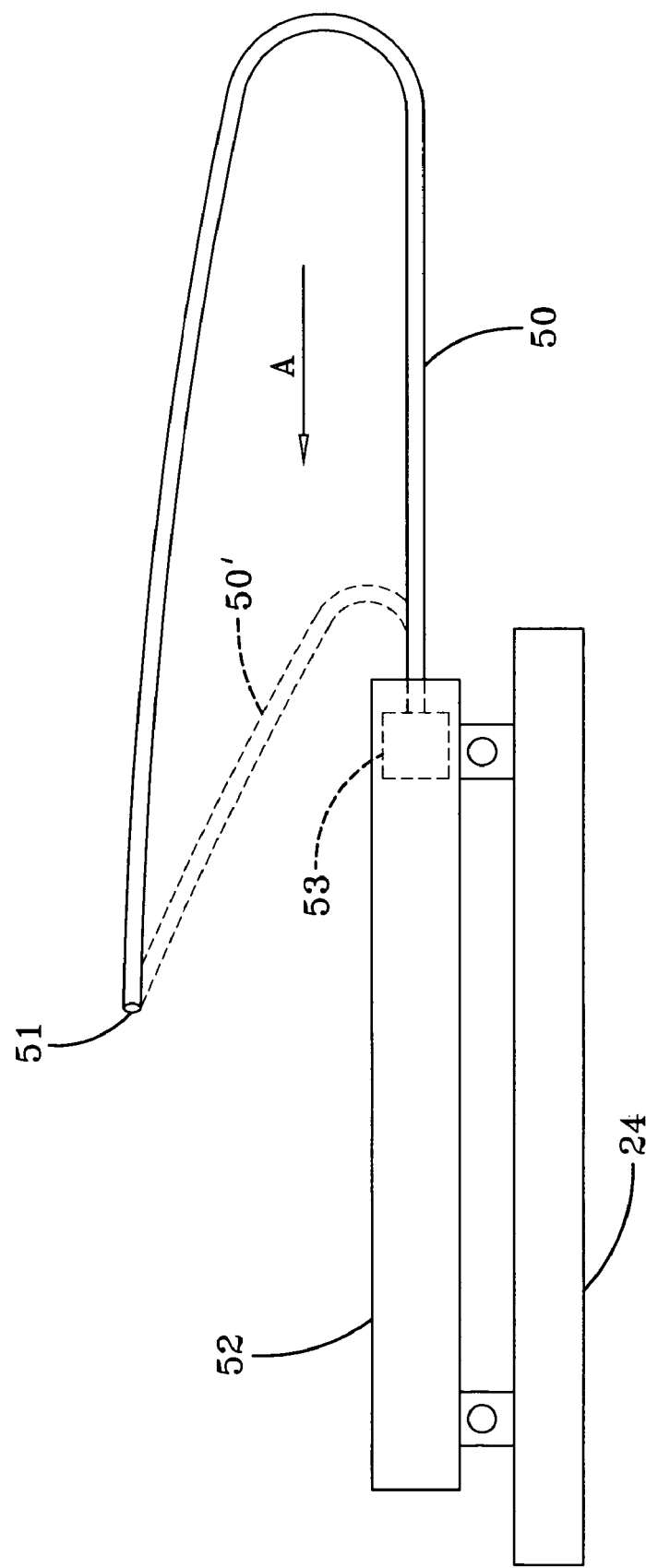
FIG. 6 is a schematic side elevation view of a pretensioner according to a second embodiment of the present invention.

FIG. 6 shows a second embodiment in which the slider bar of the first embodiment is replaced by a flexible cable 50. The flexible cable 50 preferably forms a loop, in the general form of a slider bar, to provide the flexibility of movement for the seat belt webbing and access to the rear of a vehicle, required in two door vehicle applications. The flexible cable may be directly attached to, or form at least a part of, the piston of the piston-cylinder arrangement which is preferably operated pyrotechnically. Thus this embodiment can provide an even more space saving alternative for two-door applications of pretensioners.

The seat belt webbing (not shown) is looped round the cable 50 in the same manner as with the slider bar 10 of FIG. 1 and the cable provides similar versatility of movement for the webbing mounting, and at least the same degree of access to the rear seats of the vehicle.

One end 51 of the cable 50 is attached to a structural member of the vehicle such as the sill, and the other end is attached to a piston 53 of a piston-cylinder pyrotechnic unit 52 which is attached to a structural member of the vehicle such as the floor of the vehicle, particularly to retain the door profile and avoid inhibiting access through the door.

The cable 50 forms a loop profile as shown in the figure and can be encouraged to hold such a profile in normal use by retaining clips or by an elastomeric plastic coating. Alternatively a flexible elastomeric plastic tube may cause the cable 50 to increase its stiffness to the appropriate degree.

When a crash sensor indicates that a sudden deceleration or acceleration is taking place, the pyrotechnic unit 52 is pyrotechnically activated to release gas to push the piston along the cylinder in the direction indicated by the arrow A, causing the cable 50 to retract to the profile indicated by the broken line 50'. This causes the seat belt webbing mounted on the cable 50 to be pulled back in the direction indicated by the arrow A thus effecting the required pretensioning.

A ratchet or other form of non-return mechanism may be built into the pyrotechnic unit 52.

Figure 7:
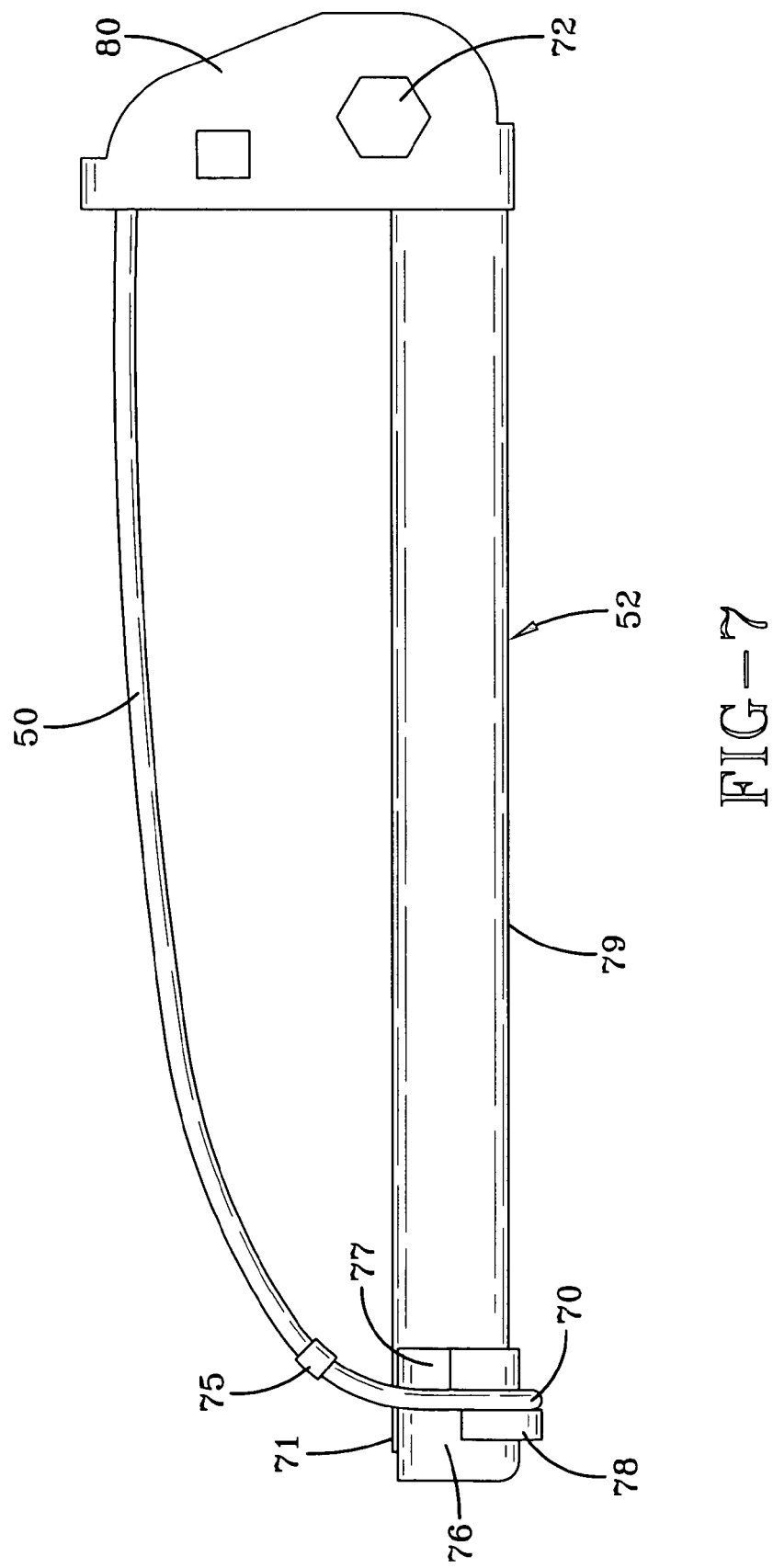
FIG. 7 is a side elevation view of a pretensioner according to a third embodiment of the present invention.
Figure 8:
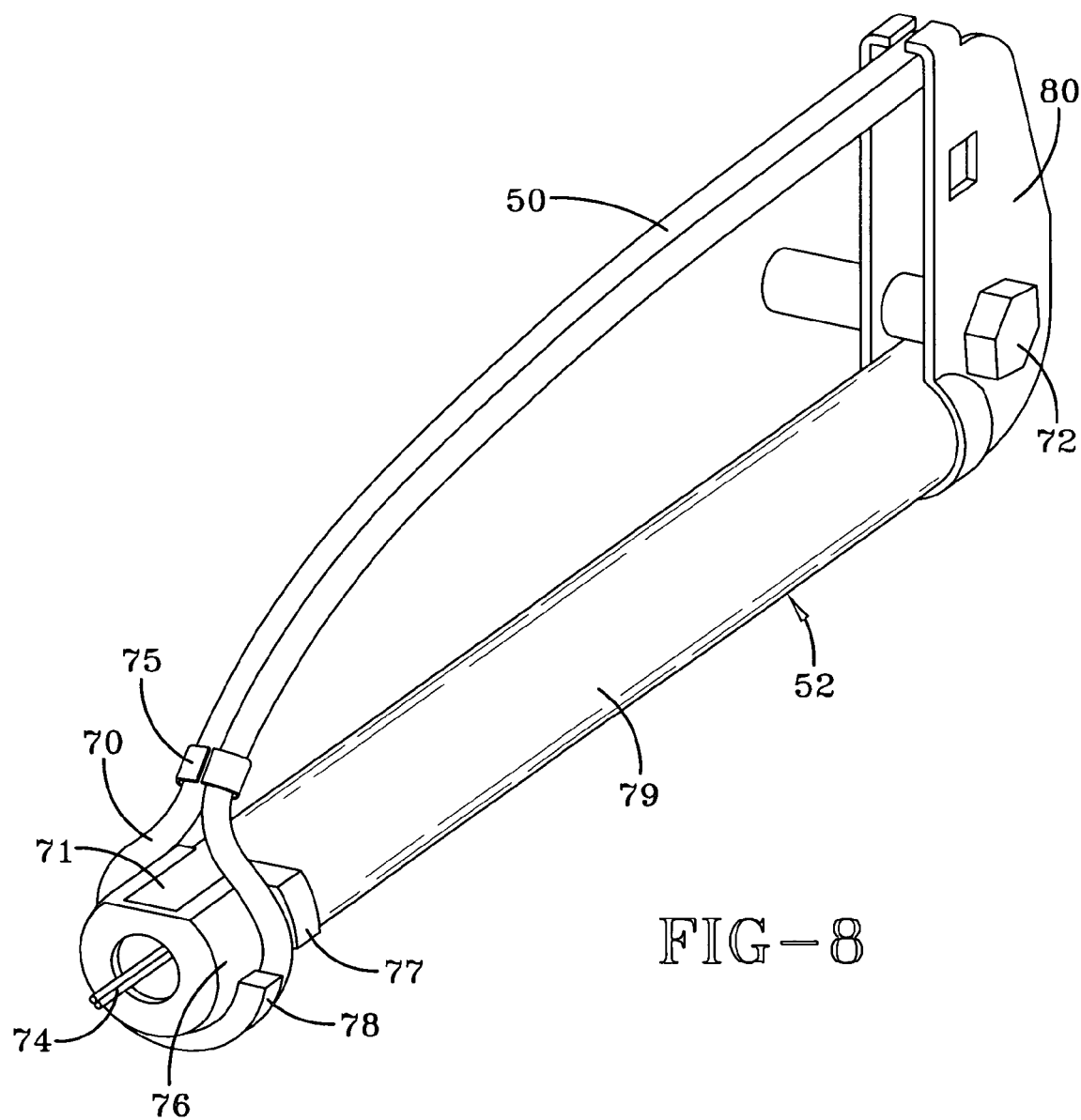
FIG. 8 is a perspective view of the pretensioner of FIG. 7.

FIG. 7 is a side elevation view of a pretensioner according to a third embodiment of the present invention and FIG. 8 is a perspective view of the pretensioner of FIG. 7. The cable may be a double cable, looped over the end of the cylinder and attached at the end in a releasable manner, for example by a member that shears, or by a mechanically releasable means. In this third embodiment a cable 50 is attached to the piston at one end of the cylinder of the pretensioner, and this cable is attached to the other end 71 of the cylinder. In this embodiment the cable 50 is folded to form a double cable and the free end is formed as a loop 70 which extends around the cylinder 79 of the pyrotechnic unit 52 and is hooked over an end 71 of the cylinder of the pyrotechnic unit. The loop 70 is secured around the cylinder 79 by a frangible or mechanically releasable means for securing which in FIGS. 7 and 8 is shown as a plastic attachment 76 mounted over the end 71 of the cylinder 79 with restraining abutments 77, 78 on either longitudinal side of the cable 50. As used herein and in the claims with respect to the restraining abutments "longitudinal" is understood to refer to the longitudinal axis of the cylinder 79. One of the abutments 77 shears when the cable 50 applies more than a predetermined force, releasing the loop 70 to slide along the cylinder of the pretensioner. Other suitable forms of means for securing the loop 71 to the end of the cylinder will be evident to a person skilled in the art.

In FIG. 7 the pyrotechnic unit 52 is attached to a structural member of a vehicle, such as a door sill or other load bearing beam, by a fastener 72, such as a threaded fastener, that extends through a first mounting member 80 located at the piston end of the cylinder 79 and a second mounting member (shown in FIG. 9) located at the other end 71 of the cylinder. According to a preferred embodiment, the structural member of the vehicle is a longitudinal chassis member such as the front door sill. The second mounting member, such as a structural member of the vehicle or a bracket bolted to the vehicle body, fits into the end of the cylinder to fix the pretensioner to the car in a load bearing manner. For every embodiment disclosed herein the second mounting member must withstand loads of around 15 kN, as specified in the standard vehicle anchorage pull test known as the R14 test. Suitable second mounting members will be evident to persons skilled in the art, and one is shown in FIG. 9 described below.

The cable loop 70 may be encased in a plastic tube allowing the cable loop to more easily slide along the cylinder 79. In addition a tie or clamp or plastic tube 75 encases a section of the cable to maintain the shape of the loop 70 by holding the double cable together. This plastic tube 75 may be longer than illustrated in FIGS. 7 and 8 to also protect the fabric of a seat belt from chaffing by the cable. A pair of wires 74 is shown exiting from the end 71 of the cylinder 79. These wires are for actuation of the pyrotechnic unit 52 located inside the cylinder 79 and could exit the cylinder at another point.

Figure 9:
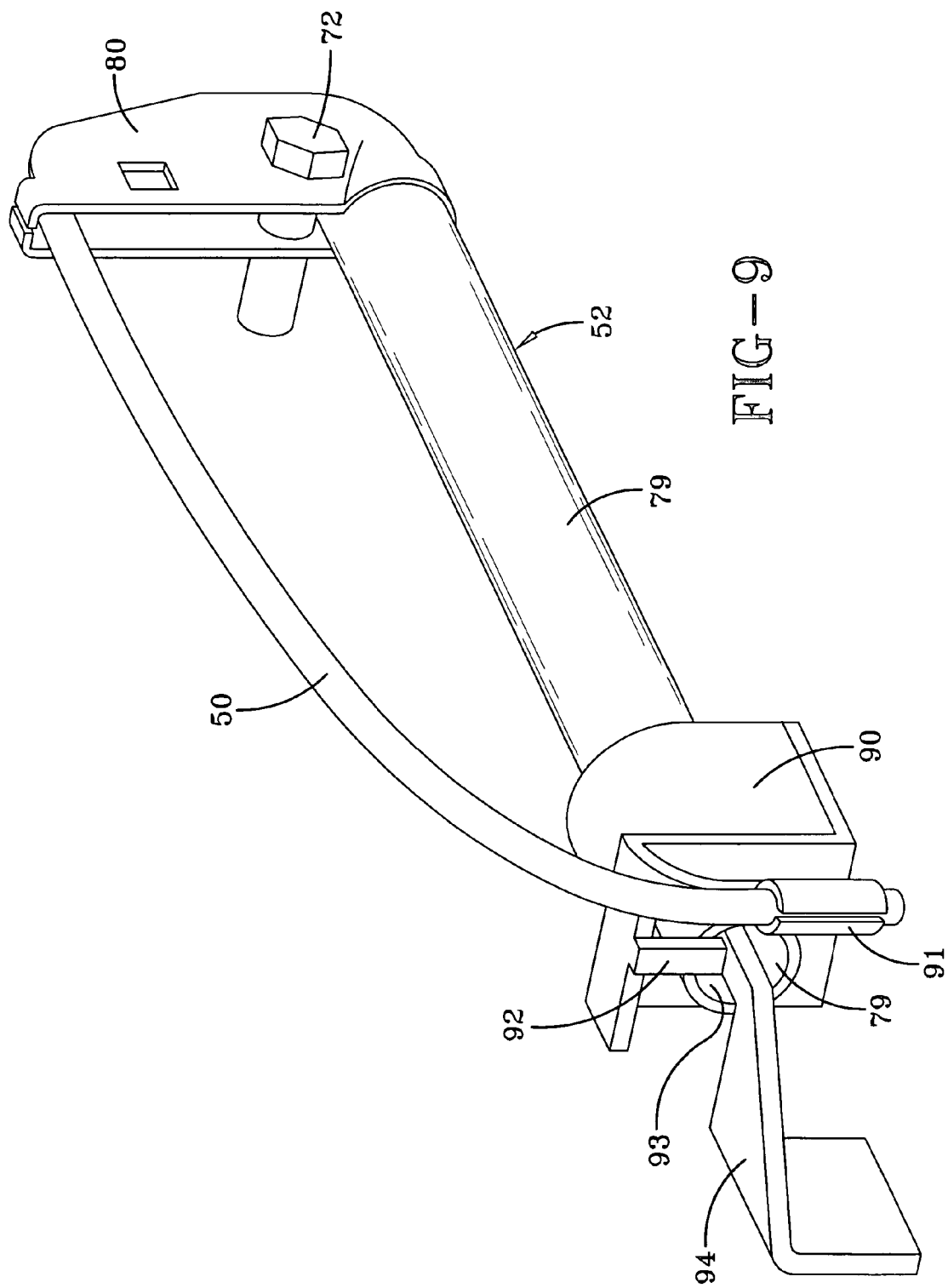
FIG. 9 is a perspective view of a pretensioner according to a fourth embodiment of the present invention.

In FIG. 9 a fourth embodiment is shown in which the cable 50 is a single cable and is attached to a carriage 90 that will slide along the cylinder 79 when the pretensioner is activated. The cable 50 is attached to the carriage 79 by welding the cable into a clamp or housing 91 mounted on the carriage 90. The carriage 90 is retained at the end 71 of the cylinder 79 by a tongue 92 on the carriage 90 fitting into a recess 93 of the cylinder 79. When the pyrotechnic unit 52 located inside of the cylinder 79 is activated, the pull on the cable will be sufficient to shear this tongue 92 and allow the carriage 90 to travel along the cylinder 79, pulling the seat belt in a pretensioning direction. Alternatively the tongue 92 can be arranged to bend to effect release of the carriage from the recess 93. A further alternative would be to use a mechanically releasable mechanism. In FIG. 9 the second mounting member is a bracket 94 fitting into an end of the cylinder 79, which can be bolted or screwed to a structural member of the vehicle. Alternatively a carriage mechanism similar to that illustrated in FIG. 5 could be used.

Figure 10:
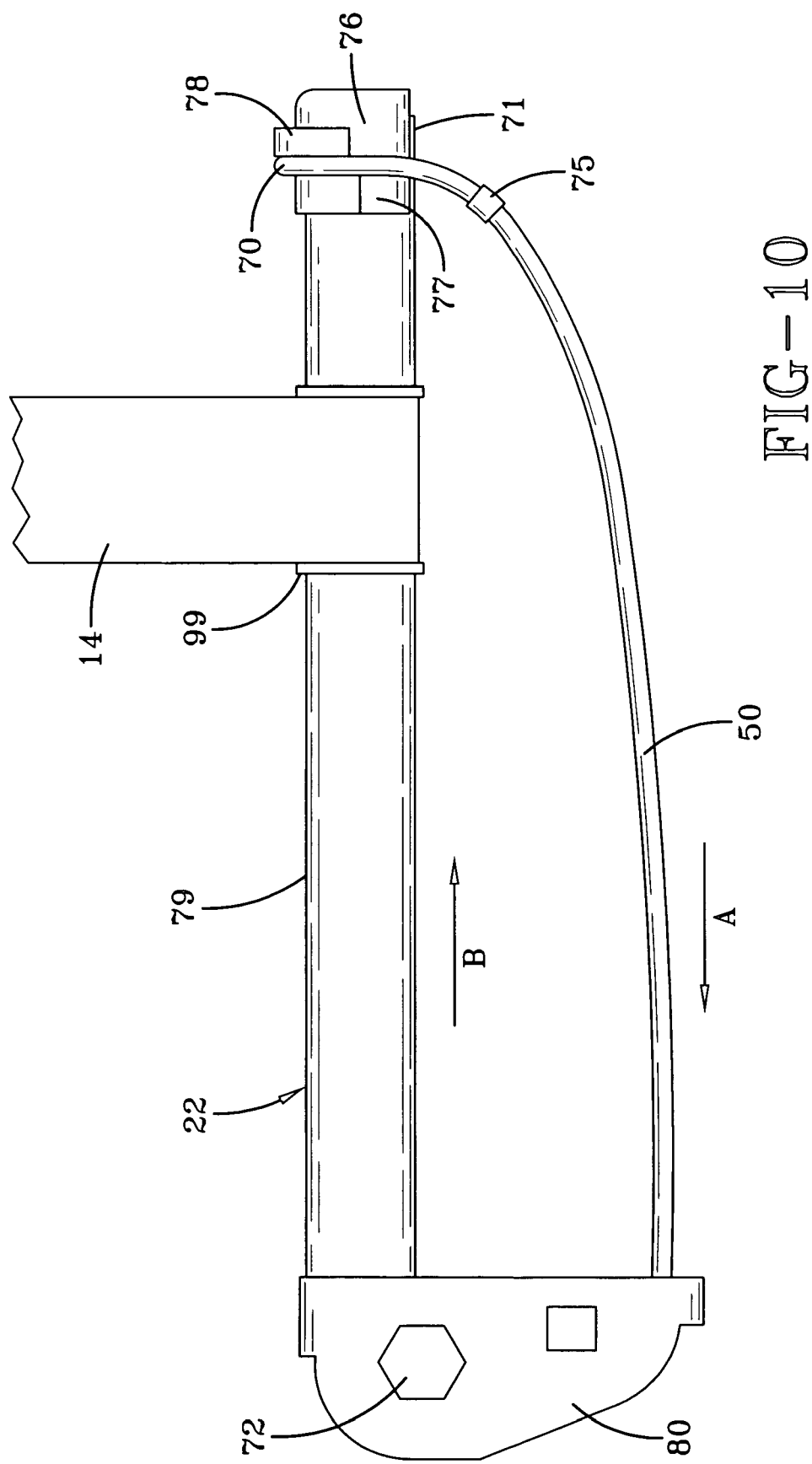
FIG. 10 is a side view of a pretensioner according to a fifth embodiment of the present invention.

FIG. 10 shows a fifth embodiment of the invention wherein the end of the seat belt webbing 14 is mounted to the cylinder 79 of the pretensioning unit 22 rather than to the cable 50. This end of the webbing 14 is attached, for example by being looped around the outer surface, of a hollow cylindrical like bobbin 99, preferably made of a plastic material, which is arranged to move freely along the length of the cylinder 79 in normal use to provide access to rear seats. Thus in this embodiment, the cylinder 79 acts effectively as a slider bar.

This fifth embodiment is similar to the embodiment shown in FIGS. 7 and 8. The loop 70 is secured around the cylinder 79 by a frangible or mechanically releasable means for securing which in FIGS. 7, 8 and 10 is shown as a plastic attachment 76 mounted over the end 71 of the cylinder 79 with restraining abutments 77, 78 on either longitudinal side of the cable 50. When a crash sensor indicates that a sudden deceleration or acceleration is taking place, the pretensioning unit 22 is pyrotechnically activated to release gas to push a piston along the cylinder 79 in the direction indicated by the arrow B causing one of the abutments 77 to shear when the cable 50 applies more than a predetermined force, releasing the loop 70 to slide along the cylinder 79 of the pretensioner in the direction indicated by the arrow A (opposite to the direction indicated by the arrow B). As the cable loop 70 moves along the cylinder 79 it forces the plastic bobbin 99 along the cylinder 79 thereby pulling the end of the webbing 14 in the pretensioning direction indicated by the arrow A.

Figure 11A:
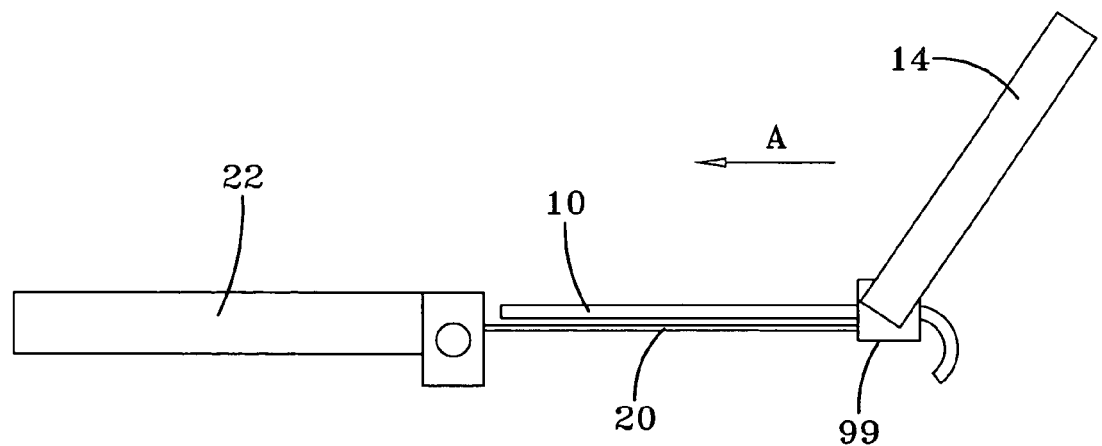
FIGS. 11A and 11B are side views of a pretensioner according to a sixth embodiment of the present invention.
Figure 11B:
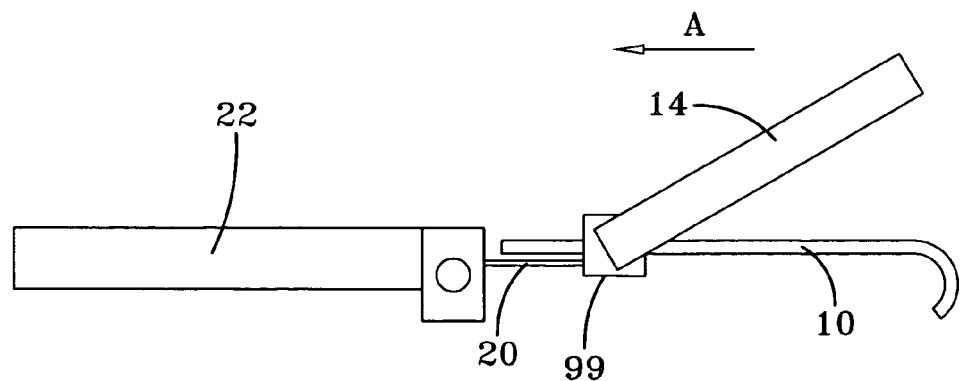

FIGS. 11A and 11B show a sixth embodiment of the invention. In FIG. 11A a pretensioning unit 22 is located at one end of the slider bar 10. The seat belt webbing 14 attached, for example by being looped around the outer surface, of a hollow cylindrical like bobbin 99 that is slideably mounted on a slider bar 10 and in normal use, when restraining a seat occupant, will adopt the forward position shown in FIG. 11A, at the opposite end of the slider bar 10 to the pretensioning unit 22. The portion of the slider bar 10 along which the bobbin 99 slides is oriented at least substantially parallel, and preferably parallel to the longitudinal axis of the cylinder of the pretensioning unit 22. A cable 20 connects the piston of the pretensioning unit 22 to the bobbin 99. When a crash sensor indicates that a sudden deceleration or acceleration is taking place, the pretensioning unit 22 is pyrotechnically activated to pull the cable 20 and thus the bobbin 99 and the webbing 14 in the pretensioning direction as shown by arrow A. FIG. 11A shows the belt 14 in an unpretensioned position and FIG. 11B after pretensioning. Of course the pretensioning unit 22 could be mounted in any orientation, for example under or adjacent the slider bar to save space, and cable guides could be fitted to avoid snagging.

Figure 12A:
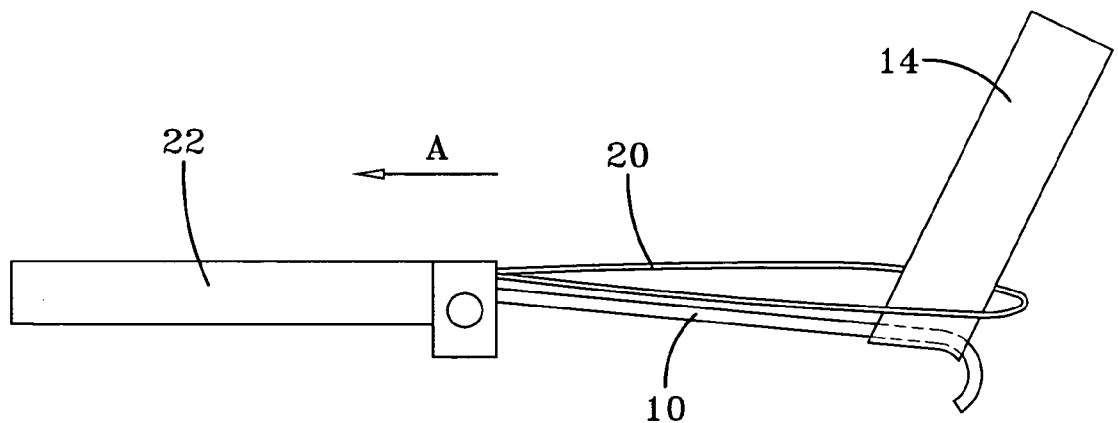
FIGS. 12A and 12B are side views of a pretensioner according to a seventh embodiment of the present invention.
Figure 12B:
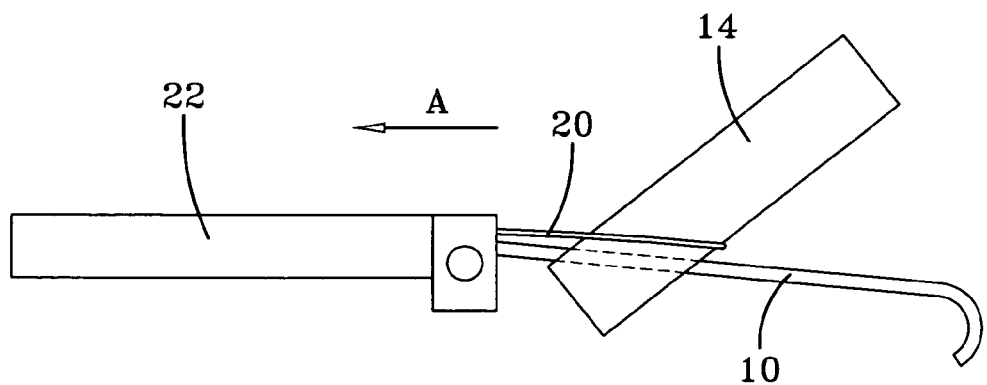

FIGS. 12A and 12B show a seventh embodiment of the present invention. The pretensioning unit 22 is located at one end of the slider bar 10 as in FIGS. 11A and 11B. However in this embodiment the end of the seat belt webbing 14 is looped directly around the slider bar 10 so as to be freely movable along the length of the slider bar in normal use, to allow the seat belt webbing to be moved away from the vehicle door when access is required to rear seats in a three-door vehicle. The cable 20 is connected to the piston in the pretensioning unit 22 and forms a loop which surrounds the seat belt webbing 14 in the region of the slider bar 10. When a crash sensor indicates that a sudden deceleration or acceleration is taking place, the pretensioning unit 22 causes the looped cable 20 to be pulled in the direction indicated by the A toward the cylinder of the pretensioning unit 22, to tighten around the webbing 14 and to pull the webbing back along the slider bar 10 in the pretensioning direction indicated by the A to the pretensioned position shown in FIG. 12B.

Figure 13:
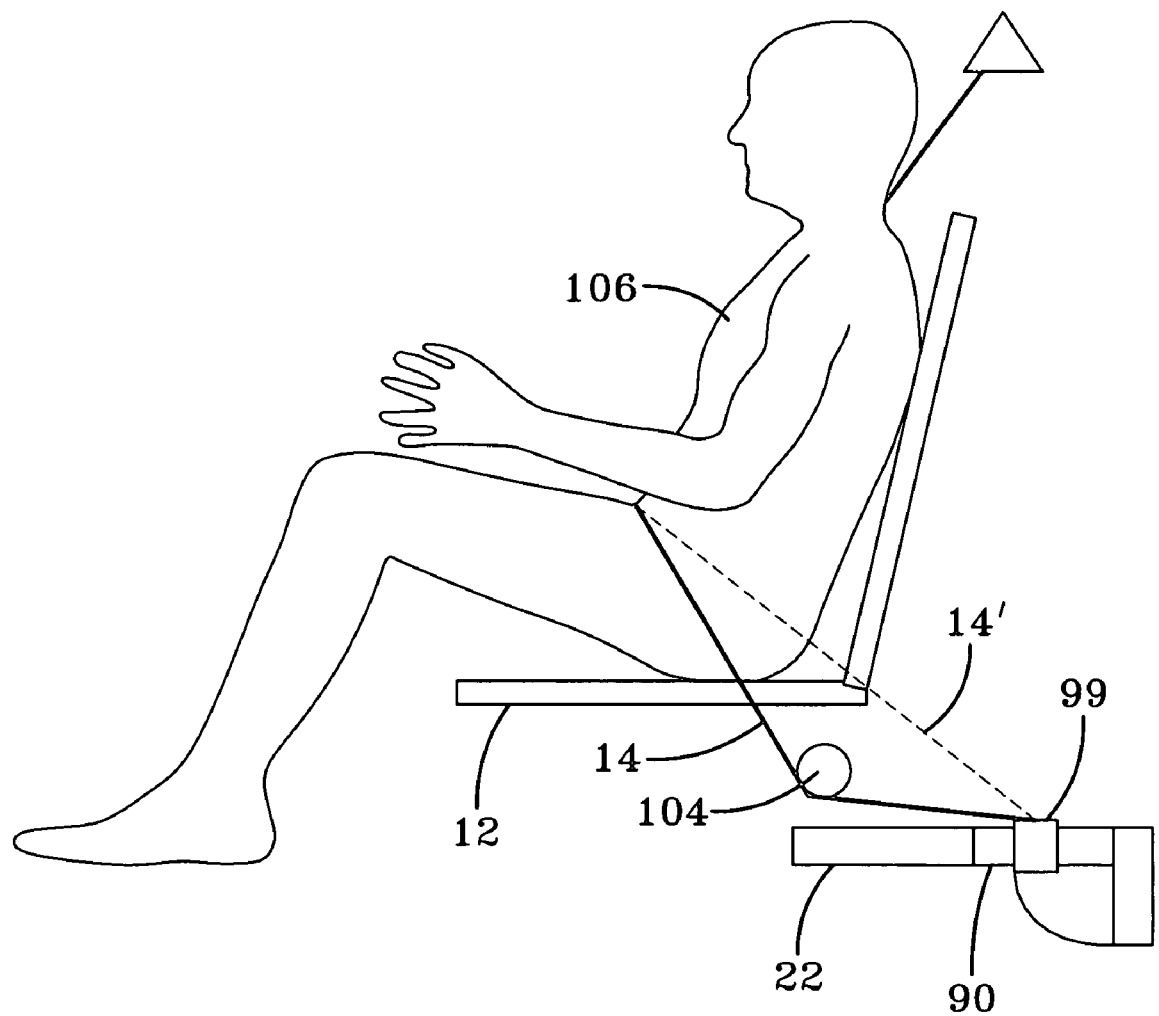
FIG. 13 is a side view of a front vehicle seat according to a further embodiment of the present invention.

FIG. 13 shows how a load bearing webbing guide 104 can be used to increase the performance of a pretensioning device that may be any one of the embodiments described above. A vehicle occupant 106 is shown sitting on a front seat 12 secured in position by a three-point seat belt 14 connected to the pretensioning unit 22, via a load bearing webbing guide 104 that causes the seat belt webbing to follow a path that is generally parallel to the line of force exerted by the pretensioning unit. The path of the webbing 14' without the load bearing webbing guide 104 is shown in broken line and the webbing 14 with the load bearing webbing guide 104 in solid line. The load bearing webbing guide 104 makes the webbing 14 travel along a line more parallel, and closer to the line of force exerted by the pretensioning unit 22, that is to say within 30 degrees, thereby increasing the performance, compared to the line of the webbing 14' without the load bearing guide 104. This increase in performance means that a physically shorter pretensioning unit 22 can be used to achieve the same pretensioning effect, i.e. to pull in the same length of webbing slack.

Figure 14A:
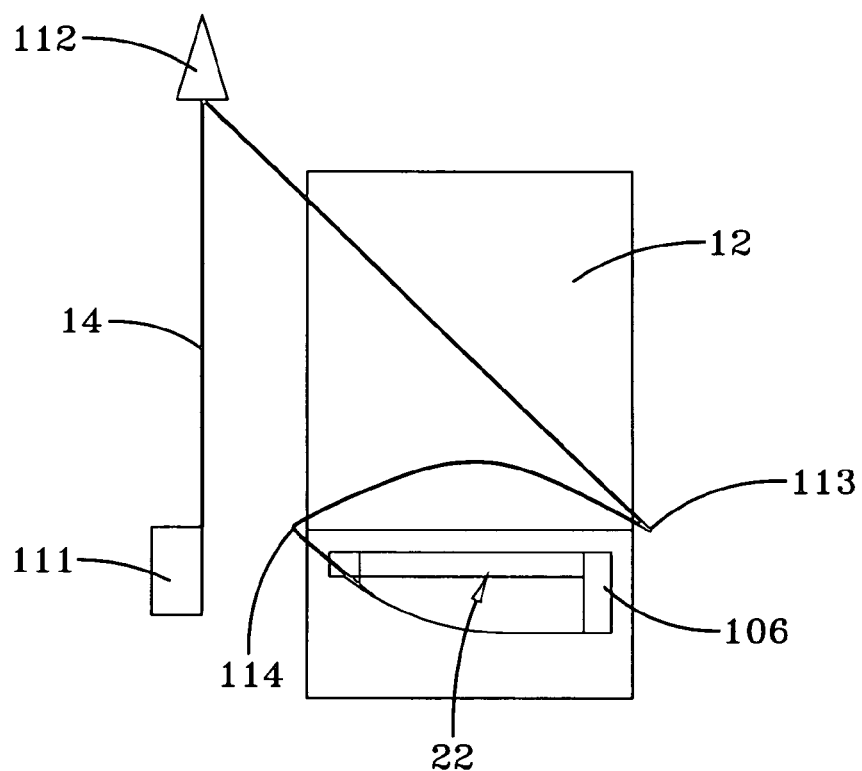
FIGS. 14A and 14B are front views of a front vehicle seat according to another embodiment of the present invention.
Figure 14B:
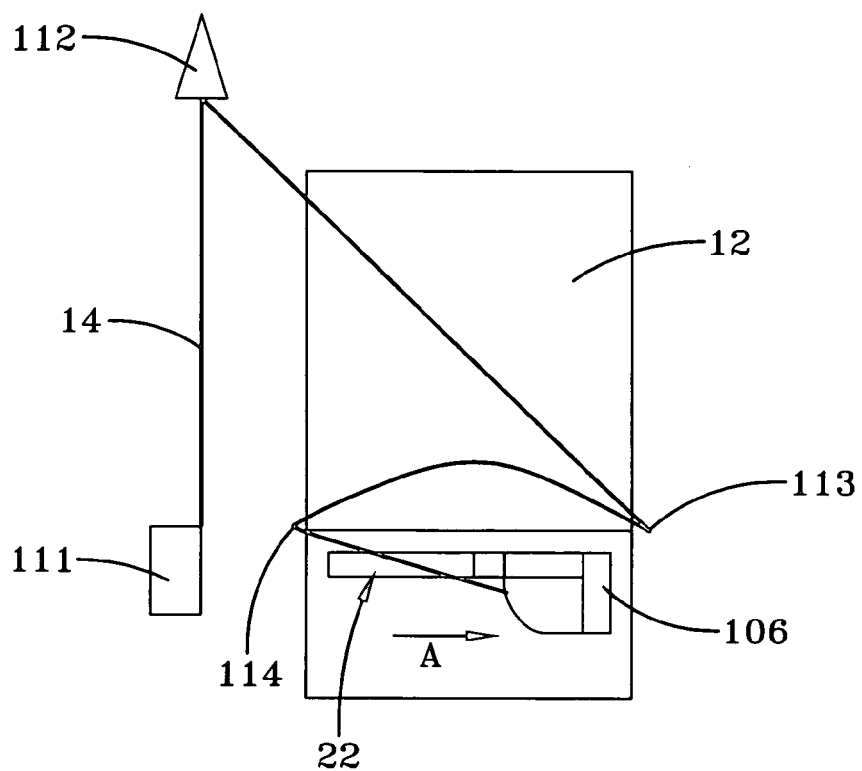

FIGS. 14A and 14B illustrate how further space can be saved by installing the pretensioning unit 22 under the seat 12. This can be used in three-door, four door, and five-door vehicles.

In FIG. 14A the vehicle seat 12 is fitted with a three-point seat belt. The seat belt webbing 14 passes from a retractor 111 upwardly to a webbing guide 112 on the B pillar of the vehicle. The seat belt webbing 14 then passes across the shoulder and torso of a seat occupant (not shown) to a buckle anchor point 113. Finally, the seat belt webbing 14 passes across the lap of the seat occupant to the sill anchor point 114 and is connected to the pretensioning unit 22 installed under the seat 12. The pretensioning unit 22 may be mounted to a load bearing part of the vehicle under the seat 12 or to the seat 12 itself and, as illustrated, takes the form of any of the embodiments disclosed in FIGS. 6 to 9 although other forms and adaptations will be evident to persons skilled in the art. FIG. 14B shows the same arrangement as FIG. 14A after pretensioning. The pretensioning unit 22 tensions the webbing 14 by pulling the end of the webbing 14 in the direction indicated by the arrow A and is capable of taking out up to 140 mm of webbing slack.

Although not shown in FIGS. 14A and 14B, a slider bar 10 can be incorporated or a cable used as a slider bar as in earlier described embodiments.

It is preferable that for the embodiments disclosed with respect to FIGS. 10–14B, there be provided a means for restraining motion of the end of the seat belt webbing 14 in a non-pretensioning direction, for example by ratchet teeth located inside of the cylinder and at least one cooperating tooth. Locking the pretensioner against return movement in this way prevents a loss of tension in the seat belt after pretensioning has been carried out. As already discussed herein, ratchet mechanisms are known for different seat belt restraint applications and so the pretensioner of the present invention can advantageously be constructed using standard parts and manufacturing processes, and thus offers a relatively low cost locking mechanism.

Of course elements of the disclosed embodiments described may be combined. For example the cable 50 could be attached to an arrangement such as the carriage 16 sliding on the rail 18, of FIG. 1. The pyrotechnic unit 52 could then be connected to the carriage 16 by another cable such as 20 in FIG. 1 and be mounted either in line with, or below, the rail 18.

Pretensioners can be constructed according to the invention having reduced or eliminated obstruction to rear seat access, smaller package sizes and which are attached to an appropriate door sill anchorage zone.

It is to be understood that the present invention is not limited to the details of any one embodiment in any one figure, but are defined by the appended claims. The scope of the appended claims should be interpreted to encompass all such modifications, similar arrangements and procedures.

We claim:

1. A pretensioner for a three point seat belt comprising:
   a cylinder adapted to be attached to a structural member of a vehicle and a piston disposed within the cylinder;
   a means for moving the piston in a direction that is longitudinal relative to the cylinder in a pretensioning direction;
   a means for attachment located outside of the cylinder to which a seat belt webbing is attached;
   a means for guiding the seat belt webbing in directions that are longitudinal with respect to the cylinder such that the seat belt webbing and the means for attachment can freely move in a direction that is longitudinal with respect to the cylinder so long as the means for moving the piston in a direction that is longitudinal relative to the cylinder in a pretensioning direction has not been activated; and a means for pulling that extends from the piston to cause the seat belt webbing to move in a direction that is longitudinal with respect to the cylinder in a pretensioning direction along the means for guiding when the means for moving the piston is activated.

2. The seat belt pretensioner according to claim 1 wherein the means for attachment comprises a hollow bobbin around which the seat belt webbing is looped.

3. The seat belt pretensioner according to claim 1 wherein the means for guiding is an exterior surface of the cylinder.

4. The seat belt pretensioner according to claim 2 wherein the means for guiding is an exterior surface of the cylinder and the bobbin slides along the exterior surface of the cylinder.

5. The seat belt pretensioner according to claim 2 wherein the means for guiding is an exterior surface of the cylinder and the bobbin slides along the exterior surface of the cylinder, one end of the means for pulling being attached to the piston and another end of the means for pulling being attached to a carriage, the carriage being configured to move along the exterior of the cylinder, the carriage being ecured to the cylinder by a frangible member such that when the means for moving the piston is activated the frangible member releases the carriage and the carriage pushes the bobbin along the exterior surface of the cylinder in a pretensioning direction.

6. The seat belt pretensioner according to claim 1 wherein the means for guiding is a slider bar.

7. The seat belt pretensioner according to claim 2 wherein the means for guiding is a slider bar and the bobbin slides along the slider bar.

8. The seat belt pretensioner according to claim 2 wherein the means for guiding is a slider bar and the bobbin slides along the slider bar, the means for pulling extending from the piston to the bobbin.

9. The seat belt pretensioner according to claim 2 wherein the means for guiding is a slider bar and the bobbin slides along the slider bar, the means for pulling extending from the piston to the bobbin, the bobbin slides along a portion of the slider bar along which is oriented substantially parallel to a longitudinal axis of the cylinder.

10. The seat belt pretensioner according to claim 2 wherein the means for guiding is a slider bar and the bobbin slides along the slider bar, the means for pulling extending from the piston to the bobbin, the bobbin slides along a portion of the slider bar along which is oriented parallel to a longitudinal axis of the cylinder.

11. The seat belt pretensioner according to claim 1 further comprising a means for restraining motion of the end of the seat belt webbing in a non-pretensioning direction following activation of the means for moving the piston.

12. The seat belt pretensioner according to claim 1 installed in a motor vehicle, the cylinder being connected to a structural member of the vehicle such that the cylinder extends longitudinally with respect to the vehicle.

13. The seat belt pretensioner according to claim 1 installed in a motor vehicle below a seating surface of a vehicle seat such that the cylinder does not extend longitudinally with respect to the vehicle.

14. The seat belt pretensioner according to claim 1 installed in a motor vehicle, the cylinder being connected to a structural member of the vehicle such that the cylinder extends in a direction that is longitudinal with respect to the vehicle, and a load bearing webbing guide causes the seat belt webbing to follow a path that is generally parallel to a line of force that will be exerted by the pretensioner when the means for moving the piston is activated.

15. The seat belt pretensioner according to claim 1 installed in a motor vehicle, the cylinder being connected to a structural member of the vehicle such that the cylinder extends in a direction that is longitudinal with respect to the vehicle, and a load bearing webbing guide causes the seat belt webbing to follow a path that is within thirty degrees of parallel to a line of force that will be exerted by the pretensioner when the means for moving the piston is activated.

16. A pretensioner for a three point seat belt comprising:

a cylinder adapted to be attached to a structural member of a vehicle and a piston disposed within the cylinder;

a pyrotechnic means for moving the piston in a direction that is longitudinal relative to the cylinder in a pretensioning direction;

a hollow bobbin located outside of the cylinder with a seat belt webbing looped around the bobbin, the cylinder extending through the hollow of the bobbin such that the bobbin and the seat belt webbing can freely move along the exterior of the cylinder so long as the pyrotechnic means for moving the piston has not been activated; and a cable, one end of the cable being attached to the piston and another end of the cable being attached to a carriage, the carriage being configured to move along the exterior of the cylinder, the carriage being secured to the cylinder by a frangible member such that when the pyrotechnic means for moving the piston is activated the frangible member releases the carriage and the carriage pushes the bobbin along the exterior surface of the cylinder in a pretensioning direction.

17. The seat belt pretensioner according to claim 16 further comprising a means for restraining motion of the end of the seat belt webbing in a non-pretensioning direction following activation of the means for moving the piston.

18. The seat belt pretensioner according to claim 16 installed in a motor vehicle below a seating surface of a vehicle seat such that the cylinder does not extend longitudinally with respect to the vehicle.

19. The seat belt pretensioner according to claim 16 installed in a motor vehicle, the cylinder being connected to a structural member of the vehicle such that the cylinder extends in a direction that is longitudinal with respect to the vehicle.

20. The seat belt pretensioner according to claim 16 installed in a motor vehicle, the cylinder being connected to a structural member of the vehicle such that the cylinder extends in a direction that is longitudinal with respect to the vehicle, and a load bearing webbing guide causes the seat belt webbing to follow a path that is generally parallel to a line of force that will be exerted by the pretensioner when the means for moving the piston is activated.

21. The seat belt pretensioner according to claim 16 installed in a motor vehicle, the cylinder being connected to a structural member of the vehicle such that the cylinder extends in a direction that is longitudinal with respect to the vehicle, and a load bearing webbing guide causes the seat belt webbing to follow a path that is within thirty degrees of parallel to a line of force that will be exerted by the pretensioner when the means for moving the piston is activated.

22. A pretensioner for a three point seat belt comprising:
a cylinder adapted to be attached to a structural member of a vehicle and a piston disposed within the cylinder;
a pyrotechnic means for moving the piston in a direction that is longitudinal relative to the cylinder in a pretensioning direction;
a slider bar along that is oriented substantially parallel to a longitudinal axis of the cylinder;
a hollow bobbin with a seat belt webbing looped around the bobbin, the slider bar extending through the hollow of the bobbin such that the bobbin and the seat belt webbing can freely move along a portion of the slider bar along that is oriented substantially parallel to a longitudinal axis of the cylinder so long as the pyrotechnic means for moving the piston has not been activated; and
a cable that extends from the piston to the bobbin to cause the bobbin and the seat belt webbing to move along the slider bar in a pretensioning direction when the pyrotechnic means for moving the piston is activated.

23. The seat belt pretensioner according to claim 22 further comprising a means for restraining motion of the end of the seat belt webbing in a non-pretensioning direction following activation of the means for moving the piston.

24. The seat belt pretensioner according to claim 22 installed in a motor vehicle below a seating surface of a vehicle seat such that the cylinder does not extend longitudinally with respect to the vehicle.

25. The seat belt pretensioner according to claim 22 installed in a motor vehicle, the cylinder being connected to a structural member of the vehicle such that the cylinder extends in a direction that is longitudinal with respect to the vehicle.

26. The seat belt pretensioner according to claim 22 installed in a motor vehicle, the cylinder being connected to a structural member of the vehicle such that the cylinder extends in a direction that is longitudinal with respect to the vehicle, and a load bearing webbing guide causes the seat belt webbing to follow a path that is generally parallel to a line of force that will be exerted by the pretensioner when the means for moving the piston is activated.

27. The seat belt pretensioner according to claim 22 installed in a motor vehicle, the cylinder being connected to a structural member of the vehicle such that the cylinder extends in a direction that is longitudinal with respect to the vehicle, and a load bearing webbing guide causes the seat belt webbing to follow a path that is within thirty degrees of parallel to a line of force that will be exerted by the pretensioner when the means for moving the piston is activated.

28. A seat belt pretensioner comprising:
a pretensioning unit connected to a sill end of a seat belt so as to be capable of moving the seat belt in a pretensioning direction in response to a signal from a crash sensor, and
a load bearing webbing guide fixed to a component of a vehicle in such a position that a section of the seat belt in the vicinity of the pretensioning unit follow a path that is within thirty degrees of parallel to a line of force that will be exerted by the pretensioner when the pretensioning unit is activated.

* * * * *